June 20, 1950
N. D. HARTLEY
2,512,426
METHOD OF SEALING THREADED MEMBERS
Filed June 7, 1945
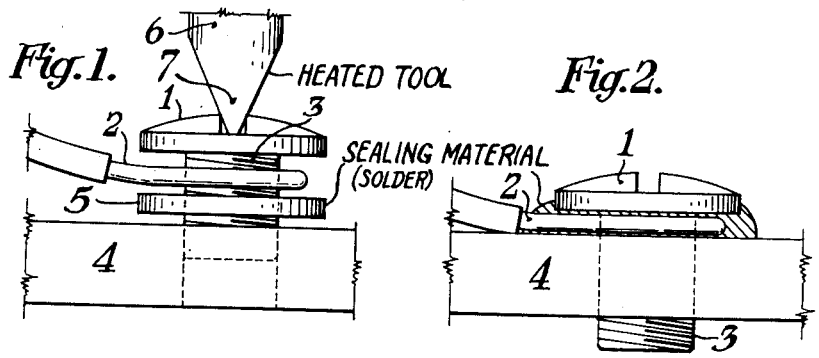
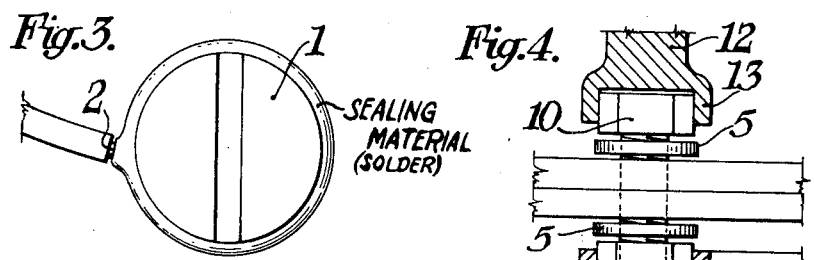
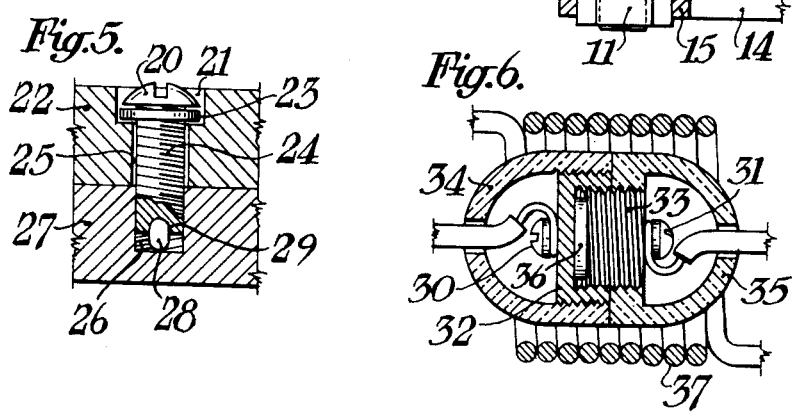
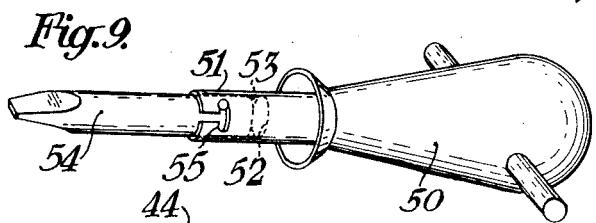
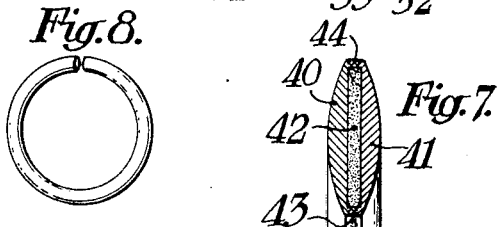
INVENTOR;
Newell D. Hartley,
BY
ATTORNEY.

Patented June 20, 1950

2,512,426

UNITED STATES PATENT OFFICE 2,512,426

METHOD OF SEALING THREADED MEMBERS

Newell D. Hartley, Devon, Conn.

Application June 7, 1945, Serial No. 598,109

2 Claims. (Cl. 113—112)

This invention relates to setting and sealing threaded fasteners, and more particularly, to a method and apparatus for setting up or tightening a threaded fastener, such, for example, as screws, posts, bolts, and the like, and at the same time sealing it with a material which becomes soft or fluid on application of heat, such, for example as solder, a thermoplastic or similar material.

Heretofore it has been the practice in forming soldered joints, for example, to make the joint and thereafter apply solder to the joint to seal the parts together. The result was undesirable in that an unattractive, rough joint was formed, this particularly being the case where screws were involved, in that the screw head would be covered and the slot therein would be filled with solder so that removal for repair was difficult, if not impossible. Furthermore, two separate operations are required. These objections were partially overcome by placing the solder beneath the screw head, tightening the screw and then melting the solder with a soldering iron to cause it to flow around the screw. This method is unsatisfactory, however, as extra operations are required and a tight joint is not necessarily obtained since the flow of the solder may leave the screw slightly loose.

It is an object of the present invention to overcome the hereinbefore noted objections and defects and to provide a method and means for quickly producing neat, clean, uniform, tight soldered and similar joints with the minimum of operations and labor. It is a further object of this invention to provide a method and means whereby a soldered or similar joint may be produced by simultaneously heating, sealing and tightening the joint.

These and ancillary objects and advantages inherent to the invention will become apparent from the following description taken in connection with the accompanying drawings wherein:

Fig. 1 is a view in elevation of a screw terminal assembly ready for the joint to be formed;

Fig. 2 is a view in elevation and Fig. 3 is a plan view of the assembly shown in Fig. 1 after the joint has been formed;

Fig. 4 is a view in elevation of a modified form of assembly and apparatus;

Fig. 5 is a view in cross-section of a modified form of assembly and sealing member;

Fig. 6 is a view in cross-section of a modified form of assembly and heating unit;

Fig. 7 is a partial view in cross-section of one form of solder washer;

Fig. 8 is a plan view of another form of solder or sealing washer; and

Fig. 9 is a view in perspective of a tightening and sealing tool in accordance with the present invention.

Referring more particularly to the drawings wherein like reference characters designate like parts throughout the several views, an assembly and apparatus for practicing the present invention is shown in Fig. 1 as comprising a terminal screw 1 having the end of an electric wire 2 wound about its shank 3 which is threaded into an aperture of a piece of stock 4. It has heretofore been the practice to seat the screw 1 tightly into the stock 4 and then smear solder over the head of said screw and about the wire 2. According to the present invention however, a member of sealing material such, for example, as a prefabricated rosin or acid-filled solder ring or washer 5, or a ring of some sealing material which will soften or become fluid on application of heat, is assembled on the shank 3 of the screw. Solder is generally used for sealing electrical connections because of its electrical characteristics and conductivity. Instead of just seating the screw and then melting the solder or other sealing material with an ordinary iron, in which event the screw would be left slightly loose due to the melting of the sealing material, the screw is seated and the solder or other sealing material is melted simultaneously by the use of a soldering iron 6 which is provided with a tip 7 in the form of a screwdriver. As heat from the tip is conducted through the screw head to the sealing material, the tool is turned whereby threading the screw into the melted sealing material.

By the use of this tool the sealing material is melted and the screw is simultaneously seated, thereby completely tightening the screw and forcing the melted material into all of the crevices between the screw, wire and stock as shown in Fig. 2. If rapid setting and cooling is desired, as in the case of mass production, the assembly may be subjected to an atmosphere of $CO_2$ or other suitable cooling agent. By this method the sealing material flows smoothly around the assembly, as shown in Fig. 3, and does not fill the screw slot, so therefore by melting the sealing material, disassembly may be easily effected for repair. There is no excess of sealing material, and as the same amount of sealing material is provided for each of a plurality of assemblies, a clean, uniform appearance is obtained. In contrast, by the prior methods, excess solder was used, the screw slot was filled with solder thereby making repair difficult, the insulation about the electric wire was burnt by the soldering iron, and there was non-uniform appearance between a plurality of assemblies.

The present invention is not limited to the ordinary screw joints as described above, but, as shown in Fig. 4, it may be employed with other types of threaded members such as the bolt 10 or the nut 11. Instead of using a screwdriver tip as shown in Fig. 1 however, the iron 12, is provided with a tip 13 in the form of a socket wrench for cooperating with the head of bolt 10 and the iron 14 is provided with the tip 15 of a strap wrench for cooperating with the nut 11. In both forms of tips, as with the screwdriver tip, they are adapted to turn the member with which they cooperate, and to simultaneously melt the rings of sealing material under said members by supplying heat which is conducted through said members from the tip to the sealing ring.

As shown in Fig. 5 another advantageous use of the present invention is the case of threaded members such as screw head 20 seated within a socket 21 of a stock piece 22. A washer of sealing material 23 may be positioned beneath the screw head 20 and by the use of the screwdriver soldering iron, in accordance with the present invention, the sealing material 23 may be melted as the screw head 20 is threaded firmly into place. The result is a clean, firmly sealed joint which would be unobtainable by the prior known methods. The structure shown in Fig. 5 is the usual assembly wherein the shank 24 of the screw extends through a bore 25 through the stock 22 and is threaded into a socket 26 of a companion stock piece 27.

In structures of this type, where the end of the threaded member is seated in a closed socket, another type of sealing element may be used with, or without, a modified form of screw. In this case the sealing material is supplied in the form of a ball or pellet, and if it is solder it may have an acid or rosin-filled core, the ball or pellet not necessarily being spherical but preferably oval in some instances. As shown in Fig. 5, a ball 28 of sealing material may be placed in the threaded socket 26 to seal the end of the screw shank 24 in said socket. When the screw is threaded down into contact with the ball of sealing material heat is conducted through the screw from the screwdriver iron to melt the material as the screw is threaded tightly into place. Ordinary flat end screws may be sealed in this manner, or a specially modified screw, as shown, may be used. The screw shank 24 may be provided with a socket 29 recessed in the end thereof adapted to hold an oval pellet 28 of sealing material. By this arrangement, the material is subject to the conducted heat from the screwdriver iron during the whole threading operation and is melted before the screw shank 24 is threaded into the socket 26. In order to eliminate the unnecessary heating of adjacent parts, the use of electronically controlled heating may be employed for the selective heating of remote predetermined areas.

The method of the present invention may be advantageously employed, in certain instances, in a somewhat different manner in connection with certain types of assemblies, such as that shown in Fig. 6, wherein ordinary tools may be used in conjunction with separate heating as by induction. A sealed unit electric connection is shown as comprising screw terminals 30 and 31 seated respectively in a cap 32 threaded on a core 33. Cover thimbles 34 and 35 may be threaded on the cap 32 and core 33. The screw terminals 30 and 31 may be assembled in a manner similar to that shown in Fig. 1. In order to insure a permanent electric connection between the cap 32 and core 33, a disc 36 of sealing material such as rosin or acid-cored solder is placed therebetween within said cap 32. After the parts are assembled, the structure may be placed within a heating coil 37 so that the sealing material is melted by the induced heat and the cap and core are threaded tightly together. This arrangement eliminates separate operations for each seal.

The solder washers may be formed in any desired manner, however, two of the preferred forms are shown in Figs. 7 and 8. In the form shown in Fig. 7 two sheets of solder are coated on one side with acid or rosin, the sheets are placed with their coated sides together and then washers or rings are punched from the sheets forming a sandwich ring comprising outer layers 40 and 41 of solder and a flat inner layer or core 42 of rosin or acid. The punching operation joins the inner and outer peripheral edges 43 and 44 of the ring to seal the rosin or acid core 42 with the ring so that it will not be affected by atmospheric conditions. The ring shown in Fig. 8 may be formed by wrapping a cored solder wire, of known type, about a mandrel of suitable diameter and then cutting the coiled wire longitudinally of the coil to produce individual split rings as shown.

A solder ring dipped in or otherwise coated with a flux could be used, or if a thermoplastic is used the ring would be made of this material.

It is not necessary that the sealing material be a separate element from the threaded fastener, but the threaded fastener itself may be coated with or made of the sealing material. In other words, the screw or bolt could either be coated with or made completely of thermoplastic material such as the melamine or vinyl resins, which, as it is set up or tightened by means of a heated tool, is itself or a certain part of it, softened or rendered sufficiently fluid as to seal itself in position.

A soldering iron suitable for use in the present method of soldering is shown in Fig. 9 as comprising a handle 50, having a tip holder 51 attached thereto, and tip holder 51 having a socket 52 for receiving the butt end 53 of a tip 54. The bayonet lock 55 or other suitable means is provided for holding the tip end 53 within the socket 52, said locking means preferably being adapted to accommodate a turning movement of the tip in either direction. The tip 54 is preferably interchangeable so as to accommodate a variety of forms such as that of the screwdriver, shown in Figs. 1 and 9, any of the forms of wrenches, such as the two shown in Fig. 4, or any other suitable or desirable shapes. Although the iron shown in Fig. 9 is the ordinary type adapted to be heated externally, it is to be understood that any of the well-known types of irons are contemplated as within the scope of invention, and a self-contained electrically operated iron would be necessary in the use of electronics and radiothermics.

It is readily evident that through the use of the present invention there are many advantages, one of the principal benefits being the saving of labor. Not only are fewer operations involved, but, in addition, such operations as are required are not only adapted for mass production but may be performed by unskilled labor. The various parts are easily assembled and no skill is required to apply and turn the soldering iron tool. Furthermore, there is a considerable saving in materials, not only in the amount of sealing material used, but in the prevention of damage to parts such as the burning of electrical insulation as hereinbefore mentioned. Moreover each seal has a neat, clean appearance, and in the case of a plurality of seals they have a uniform appearance. These features are particularly advantageous in production of wire panels, switchboards and like structures in the field of electric equipment.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The method of securing and sealing an intermediate element between a threaded female part and a screw having driver means on its head end, which comprises inserting said screw through said intermediate member into said female part and interposing therebetween a solid sealing material having a lower melting point than that of said member and threaded parts, and in one operation conducting heat from a heated driver tool to the head driver means and through the screw to melt the sealing material while simultaneously turning the driver means with said tool to tightly thread said screw into said female part to clamp said member therebetween and squeeze the melted sealing material between the abutting surfaces thereof.

2. The method of securing and sealing a terminal element between a threaded female part and the head of a cooperative screw and having a driver slot, which comprises mounting the terminal element on the screw, interposing between said element and the abutting surface of the female part a solid sealing material having a lower melting point than that of said element and parts, and in one operation conducting heat from a heated screw driver to said driver slot through said screw to melt said sealing material while simultaneously turning said driver slot by the heated screw driver to tightly thread said screw into said female part to clamp said element therebetween and squeeze the melted sealing material between the abutting surfaces of said parts and around said element and the edge of said screw head without entering the driver slot.

NEWELL D. HARTLEY.

REFERENCES CITED

The following references are of record in the file of this patent:

UNITED STATES PATENTS

| Number | Name | Date |
|---|---|---|
| 65,550 | Dunlap | June 11, 1867 |
| 243,232 | Faucher | June 21, 1881 |
| 1,495,686 | Gretz | May 27, 1924 |
| 1,559,668 | Brown et al. | Nov. 3, 1925 |
| 1,969,029 | Ostertag | Aug. 7, 1934 |
| 2,016,424 | Friden | Oct. 8, 1935 |
| 2,091,272 | Cozzens | Aug. 31, 1937 |
| 2,104,503 | Baker | Jan. 4, 1938 |
| 2,129,583 | Johansson | Sept. 6, 1938 |
| 2,242,663 | Smith | May 20, 1941 |
| 2,332,261 | Rohbach | Oct. 19, 1943 |
| 2,322,885 | Rogers | June 29, 1943 |
| 2,409,795 | Rabezzana | Oct. 22, 1946 |

FOREIGN PATENTS

| Number | Country | Date |
|---|---|---|
| 404,473 | France | Oct. 20, 1909 |
| 441,908 | Germany | Mar. 15, 1927 |

OTHER REFERENCES

Jordan, "Better Brazed and Soldered Joints Made Possible by Induction Heating," "Product Engineering," February, 1943, pages 102–105.